United States Patent
Ramachandra Iyer

(10) Patent No.: US 10,534,515 B2
(45) Date of Patent: Jan. 14, 2020

(54) METHOD AND SYSTEM FOR DOMAIN-BASED RENDERING OF AVATARS TO A USER

(71) Applicant: WIPRO LIMITED, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 117 days.

(21) Appl. No.: 15/941,009

(22) Filed: Mar. 30, 2018

(65) Prior Publication Data

US 2019/0250782 A1  Aug. 15, 2019

(30) Foreign Application Priority Data

Feb. 15, 2018  (IN) .............................. 201841005878

(51) Int. Cl.
| | | |
|---|---|---|
| *G06N 3/00* | (2006.01) | |
| *G06F 3/0484* | (2013.01) | |
| *G06T 13/40* | (2011.01) | |
| *G06F 17/27* | (2006.01) | |
| *H04L 29/06* | (2006.01) | |
| *G06F 16/383* | (2019.01) | |

(52) U.S. Cl.
CPC ............ *G06F 3/0484* (2013.01); *G06T 13/40* (2013.01); *G06F 16/383* (2019.01); *G06F 17/27* (2013.01); *G06N 3/006* (2013.01); *H04L 65/403* (2013.01)

(58) Field of Classification Search
CPC ...... G06F 3/0484; G06F 17/27; G06F 16/383; H04L 65/403; G06T 13/40; G06N 3/006
See application file for complete search history.

(56) References Cited

U.S. PATENT DOCUMENTS

| | | | |
|---|---|---|---|
| 6,545,662 | B1 | 4/2003 | Ventrella et al. |
| 9,285,951 | B2 | 3/2016 | Makofsky et al. |
| 10,158,917 | B1* | 12/2018 | Logan .................. H04N 21/472 |
| 2008/0250315 | A1* | 10/2008 | Eronen ................. G06F 16/639 |
| | | | 715/706 |
| 2009/0276703 | A1* | 11/2009 | Jones .................. G06F 9/44505 |
| | | | 715/705 |
| 2009/0307595 | A1* | 12/2009 | Clark ..................... G06N 3/006 |
| | | | 715/728 |
| 2010/0070885 | A1* | 3/2010 | Bromenshenkel ...... A63F 13/12 |
| | | | 715/757 |

(Continued)

FOREIGN PATENT DOCUMENTS

WO   WO 2014/074915   5/2014

*Primary Examiner* — Shen Shiau

(74) *Attorney, Agent, or Firm* — Finnegan, Henderson, Farabow, Garrett & Dunner, LLP

(57) ABSTRACT

A method and system for domain-based rendering of avatars to a user is disclosed. The method includes receiving, by a controller unit of a user device, a user input subsequent to launch of an application in the user device. The method further includes extracting a plurality of keywords and metadata from the user input. The method includes determining an application domain in association with the user input based on the plurality of keywords and the metadata. The method further includes selecting at least one avatar from an avatar database based on the application domain and a plurality of parameters. The method includes rendering the at least one avatar to the user to initiate a conversation.

17 Claims, 4 Drawing Sheets

(56) References Cited

U.S. PATENT DOCUMENTS

| | | | |
|---|---|---|---|
| 2010/0083148 A1* | 4/2010 | Finn | A63F 13/12 |
| | | | 715/764 |
| 2011/0141919 A1* | 6/2011 | Singh | H04L 41/0681 |
| | | | 370/252 |
| 2013/0055112 A1* | 2/2013 | Joseph | G06Q 10/107 |
| | | | 715/758 |
| 2013/0222371 A1* | 8/2013 | Reitan | G06T 19/006 |
| | | | 345/419 |
| 2013/0258040 A1 | 10/2013 | Kaytaz et al. | |
| 2014/0195621 A1* | 7/2014 | Rao Dv | H04L 12/1827 |
| | | | 709/206 |
| 2014/0229850 A1* | 8/2014 | Makofsky | A63F 13/79 |
| | | | 715/747 |
| 2015/0246286 A1* | 9/2015 | Branson | A63F 13/537 |
| | | | 463/31 |
| 2015/0302856 A1* | 10/2015 | Kim | G10L 17/22 |
| | | | 704/273 |
| 2016/0086366 A1* | 3/2016 | Crutchfield, Jr. | G06T 13/205 |
| | | | 345/473 |
| 2016/0118039 A1* | 4/2016 | Moon | G10L 15/063 |
| | | | 704/239 |
| 2016/0179416 A1* | 6/2016 | Mutha | G06F 3/0619 |
| | | | 711/162 |
| 2016/0330522 A1* | 11/2016 | Newell | G06F 21/604 |
| 2016/0360336 A1* | 12/2016 | Gross | H04W 4/025 |
| 2016/0371172 A1* | 12/2016 | Rumsey | G06F 11/3664 |
| 2017/0024442 A1* | 1/2017 | Park | G06F 9/4843 |
| 2017/0046024 A1* | 2/2017 | Dascola | H04M 1/72522 |
| 2017/0132199 A1* | 5/2017 | Vescovi | G06F 3/04842 |
| 2017/0132841 A1* | 5/2017 | Morrison | G06T 19/006 |
| 2017/0214758 A1* | 7/2017 | Engel | H04L 67/22 |
| 2017/0228367 A1* | 8/2017 | Pasupalak | G06F 17/27 |
| 2018/0350144 A1* | 12/2018 | Rathod | H04W 4/029 |

* cited by examiner

METHOD AND SYSTEM FOR DOMAIN-BASED RENDERING OF AVATARS TO A USER

TECHNICAL FIELD

This disclosure relates generally to avatar generation and more particularly to a method and system for domain-based rendering of avatars to a user.

BACKGROUND

During a conversation with an interactive system, an avatar is typically used to provide responses to a user. The avatar is a computer-generated image, which represents a person in any suitable format in a virtual environment. However, most avatars used during such conversations are same for most users and provide same responses without personalization or taking into account interests of the user. Such a situation is usually not suitable as the user may need to talk to different persons at different points of time in different scenarios during the conversation. In an existing implementation, the avatar used is a fixed avatar and is always independent of a conversation. In another existing implementation, the avatar works on pre-stored emotions. Such implementations, however, are unable to provide a rich and fulfilling user experience during the conversation.

SUMMARY

In one embodiment, a method for domain-based rendering of avatars to a user is disclosed. The method includes receiving, by a controller unit of a user device, a user input subsequent to launch of an application in the user device. The method further includes extracting, by the controller unit, a plurality of keywords and metadata from the user input. The method includes determining, by the controller unit, an application domain in association with the user input based on the plurality of keywords and the metadata. The method further includes selecting, by the controller unit, at least one avatar from an avatar database based on the application domain and a plurality of parameters. The method includes rendering, by the controller unit, the at least one avatar to the user to initiate a conversation.

In another embodiment, a system for domain-based rendering of avatars to a user is disclosed. The system includes a controller unit in a user device that includes at least one processor and a computer-readable medium storing instructions that, when executed by the at least one processor, cause the at least one processor to perform operations comprising receive a user input subsequent to launch of an application in a user device. The instructions further cause the processor to extract a plurality of keywords and metadata from the user input. The instructions cause the processor to determine an application domain in association with the user input based on the plurality of keywords and the metadata. The instructions further cause the processor to select at least one avatar from an avatar database based on the application domain and a plurality of parameters. The instructions cause the processor to render the at least one avatar to the user to initiate a conversation.

In yet another embodiment, a non-transitory computer-readable storage medium is disclosed. The non-transitory computer-readable storage medium has a set of computer-executable instructions stored thereon for receiving a user input subsequent to launch of an application in the user device; extracting a plurality of keywords and metadata from the user input; determining an application domain in association with the user input based on the plurality of keywords and the metadata; selecting at least one avatar from an avatar database based on the application domain and a plurality of parameters; and rendering the at least one avatar to the user to initiate a conversation It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
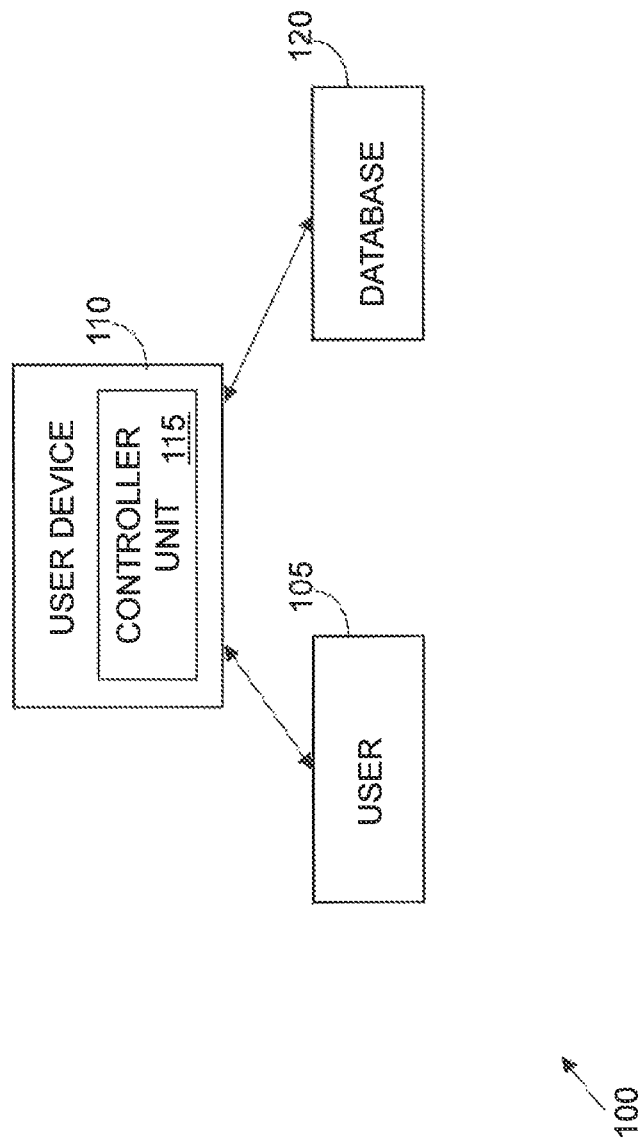
FIG. 1 is a block diagram illustrating a system for domain-based rendering of avatars to a user, in accordance with an embodiment.

Additional illustrative embodiments are listed below. In one embodiment, a system 100 for domain-based rendering of avatars to a user is illustrated in FIG. 1. The system 100 includes a user 105 that interacts with a user device 110. The user device 110 includes a controller unit 115 that provides domain-based rendering of avatars to the user 105. Examples of the user device 110 include, but are not limited to, a smartphone, a laptop, a desktop, a phablet and a tablet. The avatars and one or more parameters can be stored in a database 120. In some embodiments, the database 120 can be included within the controller unit 115.

Alternatively, the avatars and the one or more parameters may be stored on a server (not shown in FIG. 1) and may be accessed by the user device 110 via a network (not shown in FIG. 1). Network may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

When the user 105 of the user device 110, for example a smartphone, wants to access an application domain, for example banking, the user 105 launches an application, for example a banking application, in the user device 110 that is associated with the application domain. The controller unit 115 is configured to accept a user input, a text input or a voice input, from the user 105 and render avatars to the user 105 to initiate a conversation. The avatars are selected from the database 120 and are dynamically rendered to the user 105 based on the application domain and a plurality of parameters.

The controller unit 115 further includes various modules that enable domain-based rendering of the avatars to the user 105. These modules are explained in detail in conjunction with FIG. 2.

Figure 2:
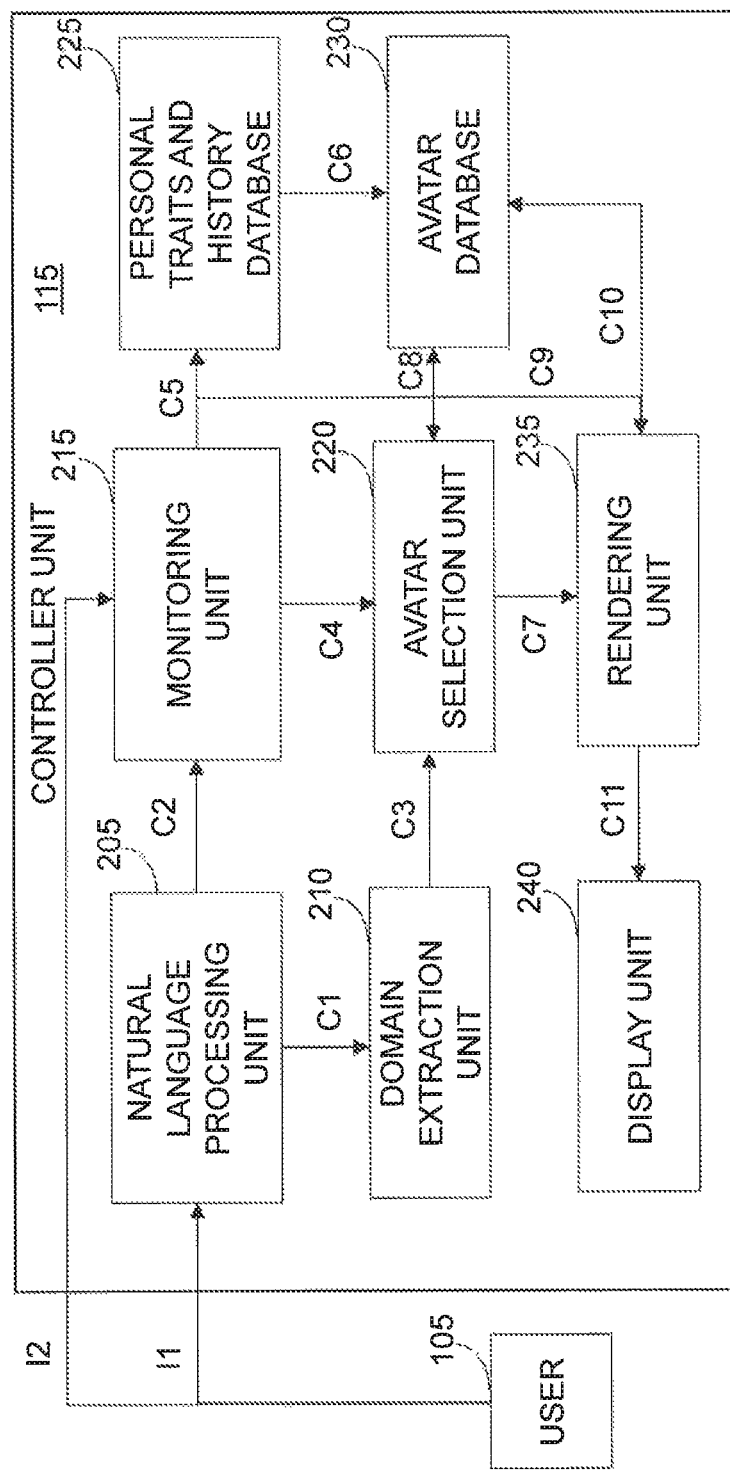
FIG. 2 is a block diagram illustrating various modules within a controller unit of a user device configured to perform domain-based rendering of avatars to a user, in accordance with an embodiment.

Referring now to FIG. 2, a block diagram illustrating various modules within the controller unit 115 of the user device 105 configured to perform domain-based rendering of avatars to a user, in accordance with an embodiment. The controller unit 115 includes a natural language processing (NLP) unit 205, a domain extraction unit 210, a monitoring unit 215, an avatar selection unit 220, a personal history and traits database 225, an avatar database 230, a rendering unit 235, and a display unit 240.

The user 105 launches the application on the user device 110. The user 105 can then interact with conversation systems or frequently asked question (FAQ) systems in the application for various reasons including remote assistance, trouble shooting of a problem that occurred in the user device 110, contact center services, and the like. The interaction between the user 105 and the application is carried out by the user 105 providing the user input (as the voice input or the text input) to at least one avatar and receiving corresponding responses from the at least one avatar. The at least one avatar plays a key role in conveying information to the user 105 through a rich interactive experience. An interface 'I1' is used by the NLP unit 205 to support conversations with the user 105. An interface 'I2' is used by the monitoring unit 215 to obtain visual data (for example, gestures of the user 105) from the user 105.

The NLP unit 205 converts the user input into text if the user input is the voice input and the text is then parsed. In one embodiment, if the user input is the text input, the text is only parsed. A plurality of keywords and metadata are then extracted from the text related to the user input. In an embodiment, the metadata includes a place of interaction mentioned by the user 105 during the launch of the application. Further, the text is also used to determine the application domain of a conversation in order to select the avatar. Some examples of the application domain include, but are not limited to, banking, travel, police, or the like. The NLP unit 205 passes the text to the domain extraction unit 210 over a connector 'C1'.

The monitoring unit 215 is configured to monitor user reactions, emotions, past experience of the user 105, and the like during the conversation with the avatar and by using the visual data of the user 105 received through the interface 'I2'. Further, the monitoring unit 215 is configured to track how the user 105 reacts to a particular avatar or avatars, how monotonous conversation affects the user 105, and the like. A connector 'C2' is used by the monitoring unit 215 to obtain parsed text from the NLP unit 205. The parsed text of the user input provides context of the conversation. The monitoring unit 215 passes information that is monitored to the personal traits and history database 225 over a connector 'C5'.

Further, the monitoring unit 215 can be configured to extract user interest level and influences rendering of the avatar by making the avatar vanish or appear, by inducing interaction among the avatars (for example, the avatars can argue among themselves and with the user 105). Required control signals pass over a connector 'C9' to the rendering unit 235.

The domain extraction unit 210 determines the application domain of the conversation or user input based on the keywords and the metadata extracted from the user input. In absence of specific context information, the domain extraction unit 210 plays a major role in selection of appropriate avatar.

The avatar selection unit 220 can be configured to select the appropriate avatar from the avatar database 230 through a connector 'C8' based on the application domain (received from the domain extraction unit 210 using a connector 'C3') and a plurality of parameters. Further, the avatar selection unit 220 can be configured to perform switchover of the avatar during runtime of the conversation. The avatar selection unit 220 decides when to invoke another avatar based on input from the monitoring unit 215 using a connector 'C4'. The avatar selection unit 220 decides which avatar needs to be invoked based on the plurality of parameters. Examples of the plurality of parameters include, but are not limited to, user familiarity with the at least one avatar based on historical data, user personal interests, past experience of the user, degree of acceptance, length of the conversation, and the like.

Further, when the avatar has to invoke another avatar, in addition to such parameters, appropriateness of the avatar to corresponding situation is considered. For example, when a banking avatar in a banking application informs the user 105 that an online police verification is required for sanction of a loan, a police avatar can pop up. If the user 105 has previously interacted with a police person in person while availing the loan from the same bank and if the same police person still exists, the same police person's avatar may be used, otherwise, any other police person is rendered to the user 105. These parameters help to decide the avatar familiar with the user 105 and who in reality, the user 105 would have interacted with, had he physically visited the place of interaction, in this case a bank.

In some embodiments, the monitoring unit 215 can be configured to dynamically monitor user behavior and avatar behavior in response to rendering of the at least one avatar to the user.

In some embodiments, the avatar selection unit 220 can be configured to invoke one or more avatars based on the user behavior and the avatar behavior.

The personal traits and history database 225 stores personal traits of known avatars, for example persons with whom the user 105 has physically made prior transactions. If specific traits are unavailable, generic traits may be used. For example, a police person and a banking agent in general have different personal traits. The personal traits include gestures, voice, expressions, and the like. Further, the personal traits and history database 225 stores the information about how the avatar changes dynamically with time. For instance, the avatar also gets frustrated if the user 105 asks a question repeatedly. Further, the personal traits and history database 225 stores history of user interactions that span change of avatars, user emotion, choice of user words, and the like. A connector 'C6' is used to transfer the information required to select the avatar from the avatar database 230. The avatar database 230 includes the avatars of people with whom the user has interacted, generic avatars, and the like. From the avatar database 230, the appropriate avatar is transferred to the rendering unit 235 over a connector 'C10'.

The rendering unit 235 decides what personal traits to apply to the avatar (received through a connector 'C7' from the avatar selection unit 220) and how to change the personal traits dynamically so that the user 105 gets a realistic experience. Further, the rendering unit 235 decides interaction among the avatars and user such as vanishing of avatar, debate among avatars, and the like.

The display unit 240 includes audio, video, expression, movement synchronization with the context. The display unit 240 obtains required avatars and the information from the rendering unit over a connector 'C11'. The method of performing domain-based rendering of the avatars to the user 105 is further explained in detail in conjunction with FIG. 3.

Figure 3:
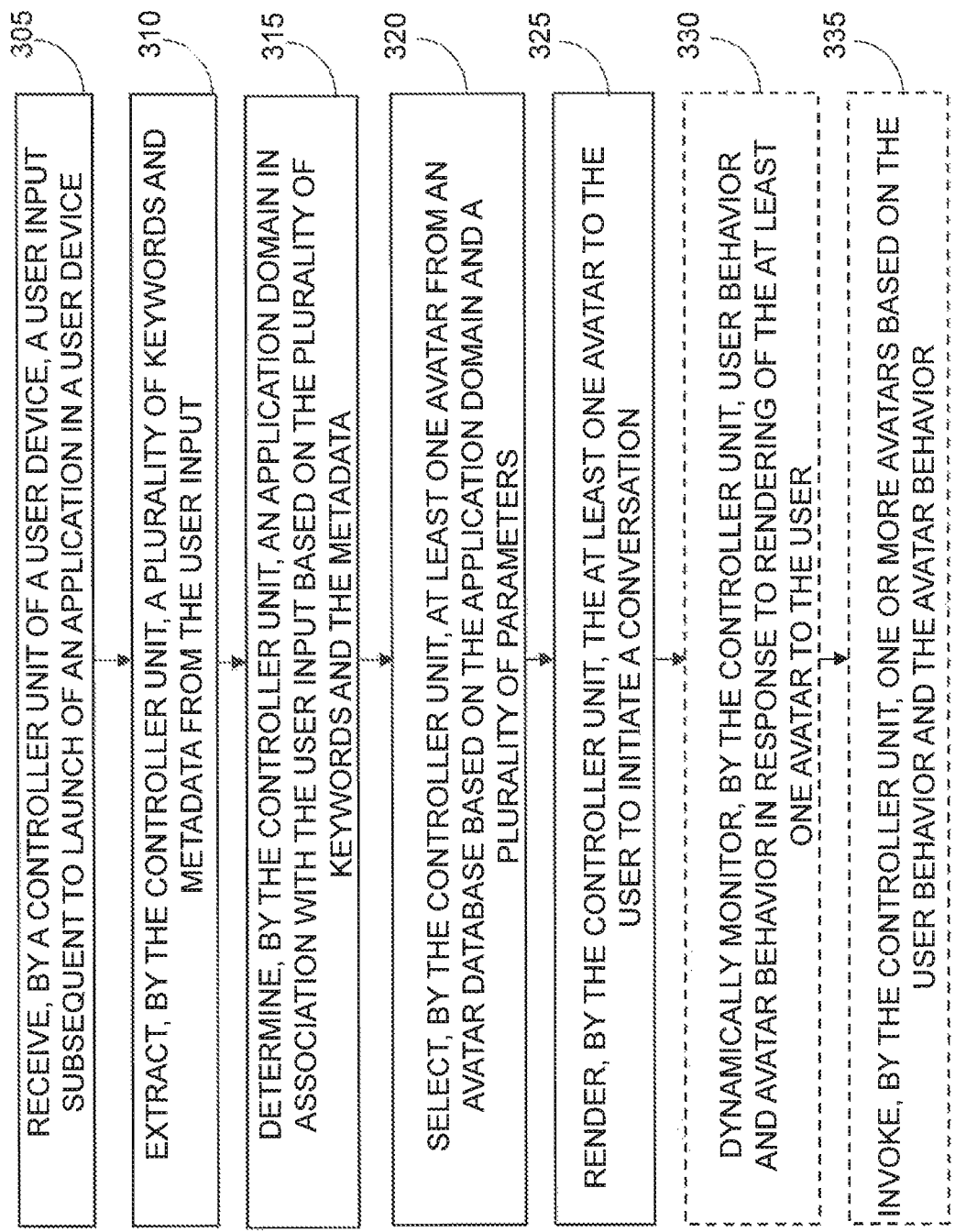
FIG. 3 illustrates a flowchart of a method for domain-based rendering of avatars to a user, in accordance with an embodiment.

Referring now to FIG. 3, a flowchart of a method 300 for performing domain-based rendering of avatars to a user, for example the user 105 of FIG. 1, is illustrated, in accordance with an embodiment. Once the user launches an application in a user device, for example a smartphone, the user can initiate a conversation with one or more avatars in the application based on an application domain.

A plurality of parameters and expressions are extracted and stored by a controller unit, for example the controller unit 115, of the user device during interaction of the user, in person, with one or more persons. The plurality of parameters and expressions are stored in a personal traits and history database, for example the personal traits and history database 225 of FIG. 2. The plurality of parameters include user familiarity with the at least one avatar based on historical data, user personal interests, past experience of the user, degree of acceptance, and length of the conversation. The plurality of parameters and expressions of the one or more persons are used to personify corresponding avatars.

Images of the persons with whom the user interacted are first collected. For example, it can be organization specific. In an example, employees working in a branch of a bank are known. The avatars of the employees are collected, stored in an avatar database (for example, the avatar database 230), and used when interaction with an employee from that bank is sought. The plurality of parameters and the expressions are also stored in the personal traits and history database along with gestures the employees make, style of speaking, and the like. In an embodiment, other avatars are also stored with their natural behavior for example, style of speaking, walking, and the like of Tom the cat, as in Tom and Jerry episodes. This process is performed offline and stored in the personal traits and history database. For example, the parameters are stored as shown in table 1 given below:

TABLE 1

| Domain | Type | Familiarity | Name(Identity) | Location | Attributes |
|---|---|---|---|---|---|
| Banking | Real | Interacted | John | URL/address | URL/address |

In table 1 above, the type indicates if the avatar is a real person, fictitious person, or a combination of both. Further, familiarity indicates if the user has interacted with the real person, seen the real person, heard about the real person, or is unfamiliar with the real person. The name indicates name of the avatar used throughout in subsequent interactions as well. Same avatar bears a same unique name throughout (like human identity) and can have a unique electronic mail id for offline communications in an implementation (not necessarily mail id of John). For instance, if the user has to upload or send some document, the user can use the unique electronic mail id. The attributes however can be different as perceived by the user.

Generally, the attributes include two parts such as role based (for example, police, politician, joker, and the like) and individualistic. In some embodiments, the user can share the avatars along with the attributes over social media. For example, the user can recommend other users to contact "John" for personal loans. The user also interacts with the user device for various applications such as FAQs, trouble shoot, and the like. The method involves use of a multimodal dialog system that supports rendering of the avatars as output along with voice and text.

At step 305, the method 300 include receiving a user input subsequent to launch of an application in the user device. In some embodiments, the user input of the user is one of a text input and a voice input. The user input is received by a Natural Language Processing (NLP) unit of a controller unit in the user device.

At step 310, the method 300 includes extracting, by the NLP unit of the controller unit, a plurality of keywords and metadata from the user input. The keywords and the metadata are transferred by the NLP unit to a domain extraction unit.

At step 315, the method 300 includes determining, by the domain extraction unit of the controller unit, an application domain in association with the user input based on the plurality of keywords and the metadata. Examples of the metadata include, but are not limited to, a place of interaction mentioned by the user during launch of the application. In an example, the user interacting with a particular branch of a bank located at No 17, ABC Street. This information is entered in the application at time of the launch of the application through a dropdown menu and/or login to the bank. The domain that is determined is transmitted to an avatar selection unit.

At step 320, the method 300 includes selecting, by the avatar selection unit of the controller unit, at least one avatar from an avatar database based on the application domain and a plurality of parameters. Examples of the application domain include, but are not limited to, police, banking, or the like. Examples of the plurality of parameters include, but are not limited to, user familiarity with the at least one avatar based on historical data, user personal interests (extracted from the social media), past experience of the user, degree of acceptance, and length of the conversation. In some embodiments, the plurality of parameters can also include, feedback on the avatar, and emotional changes during the conversation (for instance, the avatar is changed automatically during run time if the user does not like it). In some embodiments, selecting the at least one avatar includes maximizing a weighted sum of the plurality of parameters. In an embodiment, each of the above parameters are assigned with weightage of 0.25.

The above mentioned parameters are only taken into consideration and not expertise of the avatar or person. In an example, in real life, the user might have interacted with Mr. John in the bank while opening an account and is happy with the interactions. The user may select a John avatar from the avatar database to effectively campaign for home loan although Mr. John has nothing to do with such interaction, in actual. The avatar thus selected is transmitted to a rendering unit by the avatar selection unit.

At step 325, the method 300 includes rendering, by the rendering unit of the controller unit, the at least one avatar to the user to initiate the conversation. In some embodiments, before rendering the avatar to the user, personal traits of a real person represented by the avatar are to be applied so that the user would get the experience of conversing with the real person. Example of the personal traits include, style of speaking, gestures, accent, choice of words, and the like.

In some embodiments, the personal traits are varied with time dynamically based on duration of the conversation, response from the user, nature or goal of the conversation, or the like. Details are explained in following paragraphs:

Duration of conversation: If the user asks a same question multiple times in different wordings or tries to prolong the conversation, the personal traits of the selected avatar tilt towards negative progressively with a predetermined rate. For example, after every sentence or user input, a happy emotion of the conversation is reduced by 1% and sad or angry emotion in increased by 1% (configurable). After every repeat of the request, jump can be 2% unless the user suffers from Alzheimer disease.

Response from the user: If the user happens to show no interest in the response from the avatar and tries to cut short the conversation, the emotions from the avatar turn negative.

Nature or goal of the conversation: The conversations such as product demonstration, interpretation or discourse of law (by a lawyer or policeman respectively), and public awareness requires appropriate seriousness in representation. The personal traits in such scenarios, where addressing is common to all people, mapping is performed to generic traits of the category of the person (police, lawyer, and the like) instead of specific individual.

In some embodiments, if the same person is conversing in the context of a specific user (for example, a policeman John taking a complaint from Tom), the personal traits are partially individualistic (of John) and partly group specific (policeman). A relative ratio depends upon the plurality of parameters such as past interactions of Tom with John (that is, if Tom is a gentleman or an antisocial), nature of the conversation (a mere argument, complaint, pleasantry exchange.). To start with, the weightages can be 50% for both.

In some embodiments, if the avatar is new to the user, most relevant one is selected and the personal traits liked by the user (as well as generic traits expected in the role of the avatar) are applied.

In some embodiments, one or more aspects given further are considered while rendering the avatar to the user. In one aspect, each avatar ideally supports any number of users. However, if a particular avatar is attracting more network traffic, the avatar quickly invokes another avatar and vanishes. The user feels it to be real and continues the conversation with the other avatar. In another aspect, in order to make the conversation more effective, the personified avatar can have features of more than one person. For instance, face of the avatar can be that of John, but the usually thin John can be as fat as Tom. It invariably invokes the sub-conversation on how John became so fat, amusing the user.

In another aspect, the avatar emotionally responds to the user emotions or user inputs making the conversation more pleasant. It is decided by a plurality of parameters such as visible emotion from the user, previous utterances and context. For example, if the user says "I got an award yesterday", the avatar always expresses joy irrespective of the user expressions.

In another aspect, for the user to remember and distinguish multiple avatars easily, the visual distance (that may be computed as feature distance) between the avatars may be maximized. In addition, the avatars can be made to look like the people with which the user is familiar. For instance, in an interaction with Army Headquarters, all the people look alike with same uniform. In yet another aspect, unlike humans, same avatar that is pleasing to the user, can be retained eternally without making them look aged.

In another aspect, during transition, the avatar can vanish in the middle of conversation and next avatar can easily continue conversation as the context is stored and responses from the avatars are pre-defined and independent of the avatar. In yet another aspect, one of the avatars can argue in favor of the user while the other can favor against the user. This provides a very realistic effect. The user or another avatar can tell the avatar to perform some action, for example make pizza. The avatar can do it immediately on the screen. The roles of the avatars may be manipulated and switched over very easily. In one aspect, seamless flow of the information is possible since same database is used for all avatars.

In some embodiments, steps 330 and 335 are also performed by the method 300. At step 330, the method 300 includes dynamically monitoring, by the controller unit, user behavior and avatar behavior in response to rendering of the at least one avatar to the user. The monitoring involves mapping the avatar to the context and theme of the user input. The user behavior and the avatar behavior are monitored in real time. Any variation in the user emotions, interest level, and alertness results in the invoking of another avatar as detailed in step 335. The user emotion, alertness, and degree of accepting of answer well in advance based on the plurality of parameters such as frequency of interruption, number of times a keyword is repeated, history of previous interactions, personality of user instantly gathered and analyzed from the social media and the like. The point of decision to switchover to a different avatar is precisely defined. For instance, long and monotonous conversations need multiple avatar sessions to keep the user from losing interest.

At step 335, the method 300 includes invoking, by the controller unit, one or more avatars based on the user behavior and the avatar behavior. This step includes seamless change of the avatar. When the avatar is unable to provide the answer, it can handover the query to another avatar as it happens with the people in the real world. The user is to be provided with this information for smooth handoff. The avatar automatically triggers another avatar based on the user input if "more suitable" avatar can provide the response. For example, a legal query could be answered by an avatar in lawyer attire. The invoking of another avatar is determined based on the keywords in the user input (using NLP techniques) and the avatars registered in the avatar database (and user interest as mentioned above). It is a two-step approach in which a set of avatars is first determined based on goal and suitability, and second one among the set of avatars is selected based on the user interactions, history, and the like.

Further, when to invoke a different avatar and which one to invoke is determined based on the goal of the conversation, the keywords, and which databases store the response. Some use case scenarios provided below explains how the user input can lead to one avatar invoking the other avatar. In an embodiment, the avatars are dynamically or hierarchically arranged. In an embodiment, switchover or handover of the avatars is performed based on the conversation of the user.

Both avatars are retained if the response has to come from two application domains or if it is overlapping. Otherwise, only relevant avatar linked to the response is retained. If the interaction with the second avatar is taking more time and there is no role for the first avatar to speak, the first avatar vanishes after a predetermined time and takes over the screen again once the second avatar completes the conversation. Alternatively, the first avatar can pop up in between as a keen observer to incorporate element of surprise and for better user experience.

In a first use case scenario, the user "John" visits a bank for carring out some transactions and interacts with "Joe", a banking agent, who attends to John and gets the work done. However, the bank recently went fully digitized and rolled out a banking application for users to get the work done without physically visiting the bank. When John launches the banking application, he finds the avatar of Joe greeting him with his usual smile and gets into conversation to get the work done. John will get the same comfortable feeling as that of physically visiting the bank. The system has found out that, John has interacted more with Joe than with other banking agents and thus selected him as the avatar dynamically. The person Joe is in reality disconnected from this conversation.

In a second use case scenario, the user "John" is yet to receive award money for filing a patent in his organization. John would like to know when it would be credited to his bank account and puts a query to payroll group of the organization by invoking an associated query application. The avatar of Jerry from the payroll group, who typically responds to such queries, pops up and says that response may be obtained from Intellectual Property (IP) group. The avatar Jerry also transfers the query to avatar of Tom from the IP group, who in turn provides the required response based on available documents and policies. At the end of the day, the queries directed to avatar Tom and the responses are collated and rendered to real person Tom to keep him aware of what has occurred. It also helps to get historical data when another person replaces Tom.

Figure 4:
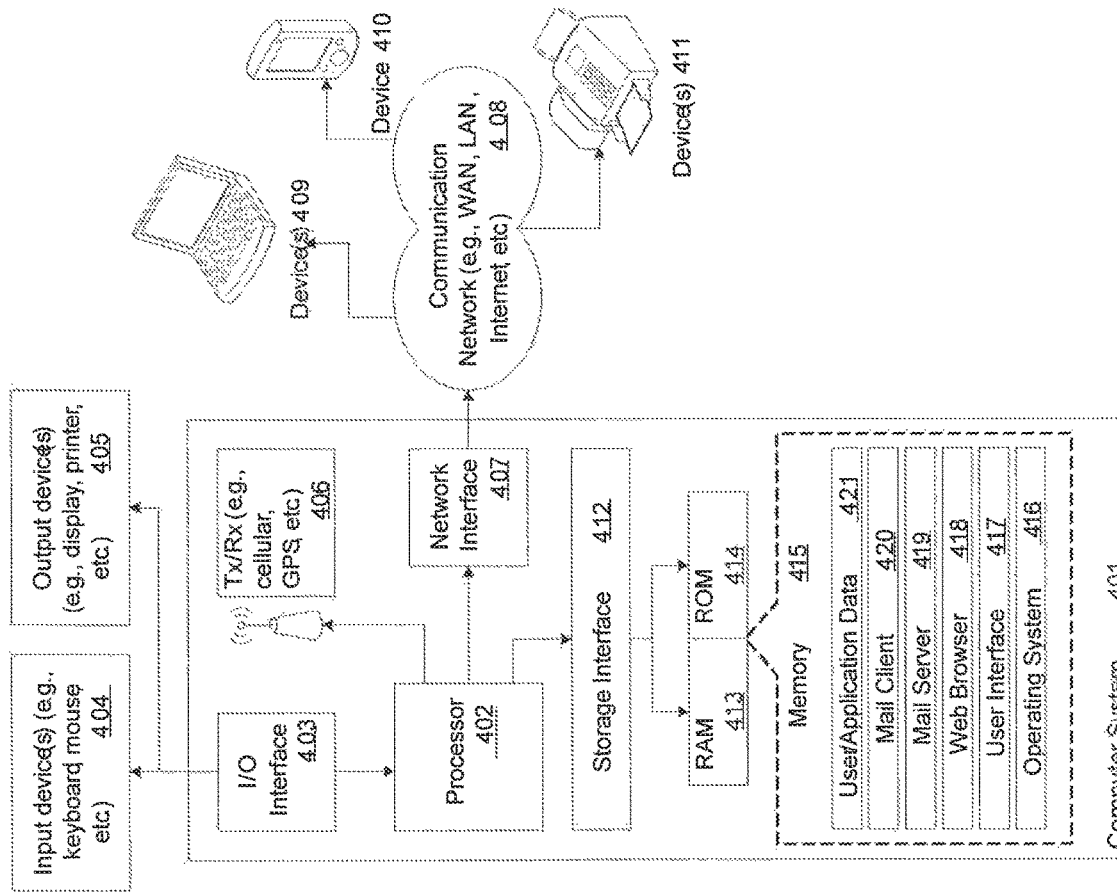
FIG. 4 illustrates a block diagram of an exemplary computer system for implementing various embodiments.

FIG. 4 is a block diagram of an exemplary computer system for implementing various embodiments. Computer system 402 may include a central processing unit ("CPU" or "processor") 404. Processor 404 may include at least one data processor for executing program components for executing user- or system-generated requests. A user may include a person, a person using a device such as such as those included in this disclosure, or such a device itself. Processor 404 may include specialized processing units such as integrated system (bus) controllers, memory management control units, floating point units, graphics processing units, digital signal processing units, etc. Processor 404 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 404 may be disposed in communication with one or more input/output (I/O) devices via an I/O interface 406. I/O interface 406 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 406, computer system 402 may communicate with one or more I/O devices. For example, an input device 408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 410 may be a printer, fax machine, video display (e.g., cathode ray tube (CRT), liquid crystal display (LCD), light-emitting diode (LED), plasma, or the like), audio speaker, etc. In some embodiments, a transceiver 412 may be disposed in connection with processor 404. Transceiver 412 may facilitate various types of wireless transmission or reception. For example, transceiver 412 may include an antenna operatively connected to a transceiver chip (e.g., TEXAS® INSTRUMENTS WILINK WL1283® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 404 may be disposed in communication with a communication network 414 via a network interface 416. Network interface 416 may communicate with communication network 414. Network interface 416 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 414 may include, without limitation, a direct interconnection, local area network (LAN), wide area network (WAN), wireless network (e.g., using Wireless Application Protocol), the Internet, etc. Using network interface 416 and communication network 414, computer system 402 may communicate with devices 418, 420, and 422. These devices may include, without limitation, personal computer(s), server(s), fax machines, printers, scanners, various mobile devices such as cellular telephones, smartphones (e.g., APPLE® IPHONE® smartphone, BLACKBERRY smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 402 may itself embody one or more of these devices.

In some embodiments, processor 404 may be disposed in communication with one or more memory devices (e.g., RAM 426, ROM 428, etc.) via a storage interface 424. Storage interface 424 may connect to memory 430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 430 may store a collection of program or database components, including, without limitation, an operating system 432, user interface application 434, web browser 436, mail server 438, mail client 440, user/application data 442 (e.g., any data variables or data records discussed in this disclosure), etc. Operating system 432 may facilitate resource management and operation of computer system 402. Examples of operating systems 432 include, without limitation, APPLE® MACINTOSH® OS X platform, UNIX platform, Unix-like system distributions (e.g., Berkeley Software Distribution (BSD), FreeBSD, NetBSD, Open-BSD, etc.), LINUX distributions (e.g., RED HAT, UBUNTU®, KUBUNTU®, etc.), IBM® OS/2 platform, MICROSOFT® WINDOWS® platform (XP, Vista/7/8, etc.), APPLE IOS® platform, GOOGLE® ANDROID® platform, BLACKBERRY® OS platform, or the like. User interface 434 may facilitate display, execution, interaction, manipulation, or operation of program components through textual or graphical facilities. For example, user interfaces may provide computer interaction interface elements on a display system operatively connected to computer system 402, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH platform, etc.), or the like.

In some embodiments, computer system 402 may implement a web browser 436 stored program component. Web browser 436 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 402 may implement a mail server 438 stored program component. Mail server 438 may be an Internet mail server such as MICROSOFT® EXCHANGE® mail server, or the like. Mail server 438 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 438 may utilize communication protocols such as internet message access protocol (IMAP), messaging application programming interface (MAPI), Microsoft Exchange, post office protocol (POP), simple mail transfer protocol (SMTP), or the like. In some embodiments, computer system 402 may implement a mail client 440 stored program component. Mail client 440 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 402 may store user/application data 442, such as the data, variables, records, etc. as described in this disclosure. Such databases may be implemented as fault-tolerant, relational, scalable, secure databases such as ORACLE® database OR SYB-ASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a method and system for domain-based rendering of avatars to a user. The proposed method involves providing unique identifiers for the avatars, including the one selected by the user, allocating the avatars for the conversations, estimating course of conversation, dynamic deployment of the avatars, and personifying of traits in the avatar. The method provides a seamless rendering of avatars to the user based on the user input and application domain. The proposed method provides better user interaction and reduced conversation resources. Replacing humans with avatars further reduces burden on resources and allows replications. Moreover, the conversations are personalized to provide an accurate and effective solution.

The specification has described method and system for domain-based rendering of avatars to a user. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of domain-based rendering of avatars to a user, the method comprising:
   receiving, by a controller unit of a user device, a user input subsequent to launch of an application in the user device;
   extracting, by the controller unit, a plurality of keywords and metadata from the user input;
   determining, by the controller unit, an application domain in association with the user input based on the plurality of keywords and the metadata;
   selecting, by the controller unit, at least one avatar from an avatar database based on the application domain and a plurality of parameters; and
   rendering, by the controller unit, the at least one avatar to the user to initiate a conversation.

2. The method of claim 1 and further comprising:
   dynamically monitoring, by the controller unit, user behavior and avatar behavior in response to rendering of the at least one avatar to the user; and
   invoking, by the controller unit, one or more avatars based on the user behavior and the avatar behavior.

3. The method of claim 1, wherein the user input of the user is one of a text input and a voice input.

4. The method of claim 1, wherein the metadata includes a place of interaction mentioned by the user during launch of the application.

5. The method of claim 1, wherein the plurality of parameters comprises user familiarity with the at least one avatar based on historical data, user personal interests, past experience of the user, degree of acceptance, and length of the conversation.

6. The method of claim 1, wherein selecting the at least one avatar comprises maximizing a weighted sum of the plurality of parameters.

7. The method of claim 1, wherein the rendering the at least one avatar to the user comprises applying personal traits of a person represented by the at least one avatar to personalize user experience of the user, wherein the personal traits comprises style of speaking, gestures, accent, and choice of words.

8. The method of claim 7, wherein the personal traits are dynamically varied with time based on duration of the conversation, response from the user, and nature of the conversation.

9. A system for domain-based rendering of avatars to a user, the system comprising:
   a controller unit in a user device comprising at least one processor and a computer-readable medium storing instructions that, when executed by the at least one processor, cause the at least one processor to perform operations comprising:
      receive a user input subsequent to launch of an application in the user device;
      extract a plurality of keywords and metadata from the user input;
      determine an application domain in association with the user input based on the plurality of keywords and the metadata;
      select at least one avatar from an avatar database based on the application domain and a plurality of parameters; and
      render the at least one avatar to the user to initiate a conversation.

10. The system of claim 9 and further comprising:
    dynamically monitoring user behavior and avatar behavior in response to rendering of the at least one avatar to the user; and
    invoking one or more avatars based on the user behavior and the avatar behavior.

11. The system of claim 9, wherein the user input of the user is one of a text input and a voice input.

12. The system of claim 9, wherein the metadata includes a place of interaction mentioned by the user during launch of the application.

13. The system of claim 9, wherein the plurality of parameters comprises user familiarity with the at least one avatar based on historical data, user personal interests, past experience of the user, degree of acceptance, and length of the conversation.

14. The system of claim 9, wherein selecting the at least one avatar comprises maximizing a weighted sum of the plurality of parameters.

15. The system of claim 9, wherein the rendering the at least one avatar to the user comprises applying personal traits of a person represented by the at least one avatar to personalize user experience of the user, wherein the personal traits comprises style of speaking, gestures, accent, and choice of words.

16. The system of claim 15, wherein the personal traits are dynamically varied with time based on duration of the conversation, response from the user, and nature of the conversation.

17. A non-transitory computer-readable medium storing computer-executable instructions for:
    receiving a user input subsequent to launch of an application in the user device;
    extracting a plurality of keywords and metadata from the user input;
    determining an application domain in association with the user input based on the plurality of keywords and the metadata;
    selecting at least one avatar from an avatar database based on the application domain and a plurality of parameters; and
    rendering the at least one avatar to the user to initiate a conversation.

* * * * *